United States Patent
Kuo et al.

(10) Patent No.: US 9,229,147 B2
(45) Date of Patent: Jan. 5, 2016

(54) BACKLIGHT MODULE SUITABLE FOR TRANSPORTATION

(71) Applicant: Shenzhen China Star Optoelectronics Technology Co., Ltd., Shenzhen, Guangdong (CN)

(72) Inventors: Yi-cheng Kuo, Guangdong (CN); Shih Hsiang Chen, Guangdong (CN); Gege Zhou, Guangdong (CN); Gang Yu, Guangdong (CN); Jiaqiang Wang, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 242 days.

(21) Appl. No.: 13/703,028

(22) PCT Filed: Oct. 9, 2012

(86) PCT No.: PCT/CN2012/082623
§ 371 (c)(1),
(2) Date: Dec. 9, 2012

(87) PCT Pub. No.: WO2014/036773
PCT Pub. Date: Mar. 13, 2014

(65) Prior Publication Data
US 2014/0078774 A1 Mar. 20, 2014

(30) Foreign Application Priority Data
Sep. 6, 2012 (CN) .......................... 2012 1 0327274

(51) Int. Cl.
*F21V 8/00* (2006.01)
*G02F 1/1335* (2006.01)

(52) U.S. Cl.
CPC ........ *G02B 6/0013* (2013.01); *G02F 1/133608* (2013.01)

(58) Field of Classification Search
CPC ...... F21V 7/04; G02B 6/0038; G02B 6/0053; G02B 6/0036; G02B 6/133606; G02B 6/0031; G02B 6/0068; G02B 6/0028; G02B 6/0061
USPC .................................. 362/606, 607, 609, 618
See application file for complete search history.

(56) References Cited

U.S. PATENT DOCUMENTS

| | | | |
|---|---|---|---|
| 2008/0074580 A1* | 3/2008 | Chang | 349/65 |
| 2011/0090425 A1* | 4/2011 | Nakagome | 349/64 |
| 2011/0304792 A1* | 12/2011 | Lee et al. | 349/58 |
| 2012/0224120 A1* | 9/2012 | Koyama | 349/62 |
| 2012/0268656 A1* | 10/2012 | Takano | 348/725 |

* cited by examiner

*Primary Examiner* — Alan Cariaso
*Assistant Examiner* — Mark Tsidulko

(57) ABSTRACT

The present invention relates to a backlight module suitable for transportation, which comprises a backlight unit, the backlight unit comprises a backplate, and a light source, as well as an optical film, a light guide plate and a reflection plate arranged in sequence on the backplate from up to down; the backlight module further comprises a fixing belt used for fixing the optical film, the fixing belt being tightly tied outside the backlight unit along at least one of the length and width directions of the backlight unit. This backlight module uses the fixing belt to fix the optical film instead of using the rubber frame to press against the optical film, thus the cost of the rubber frame assembly is saved, the optical film can be prevented from translocating due to vibration, and the winding strength can be ensured to be moderate.

4 Claims, 3 Drawing Sheets

BACKLIGHT MODULE SUITABLE FOR TRANSPORTATION

FIELD OF THE INVENTION

The present invention relates to a subassembly of a liquid crystal display device assembly, and more particularly to a backlight module suitable for transportation.

BACKGROUND OF THE INVENTION

The liquid crystal display device has high contrast, and superiority in the mobile image display, and has therefore been widely used in electronic devices such as TVs, monitors, cell phones and panel computers.

FIG. 1 is a sectional view of a liquid crystal display device in the prior art. As shown in FIG. 1, this liquid crystal display device includes a front shell 1, a liquid crystal panel 2, and a backlight unit. Wherein the liquid crystal panel 2 is installed between the front shell 1 and the backlight unit. The backlight unit includes a light guide plate 3, a reflection plate 4 arranged under the light guide plate 3, an optical film 5 arranged above the light guide plate 3, and a backplate 6 arranged under the reflection plate 4.

Wherein the backplate 6 is used for carrying all the components of the backlight unit and ensuring the flatness of the backlight unit. A rubber frame (not shown), arranged above the optical film 5, is used for pressing against the optical film 5 during transportation, so as to prevent the backlight unit from escaping on the way of transportation. However, the addition of the rubber frame will increase the cost of the subassembly.

SUMMARY OF THE INVENTION

Aiming at the defect of the backlight module in the prior art of needing the rubber frame to fix the optical film and increasing the cost, the technical problem to be solved by the present invention is to provide a backlight module suitable for transportation which can save the rubber frame and reduce the cost.

The present invention adopts the following technical solution to solve its technical problem: a backlight module suitable for transportation is provided, comprising a backlight unit, which comprises a backplate, a light source, as well as an optical film, a light guide plate and a reflection plate arranged in sequence on the backplate from up to down; the backlight module further comprises a fixing belt used for fixing the optical film, the fixing belt is tightly tied outside the backlight unit along at least one of the length and width directions of the backlight unit.

In the backlight module suitable for transportation according to the present invention, the fixing belt is a closed ring in shape.

In the backlight module suitable for transportation according to the present invention, the fixing belt is made of elastic materials.

In the backlight module suitable for transportation according to the present invention, the fixing belt is a packing belt or an elastic ring.

In the backlight module suitable for transportation according to the present invention, there are a plurality of fixing belts.

In the backlight module suitable for transportation according to the present invention, the fixing belt is tightly tied in intersecting pattern outside the backlight unit along the length and width directions of the backlight unit.

In the backlight module suitable for transportation according to the present invention, the backplate includes a backplane, and a side plate located at an end of the backplane and perpendicular to the backplane.

In the backlight module suitable for transportation according to the present invention, the width direction is the extension direction of the side plate.

In the backlight module suitable for transportation according to the present invention, the backlight unit further includes a lamp strip fixed on the side plate, with the light source fixed on the lamp strip.

The backlight module suitable for transportation according to the present invention has the following beneficial effects: By using the fixing belt to fix the optical film instead of using the rubber frame to press against the optical film, the cost of the rubber frame component is saved, the optical film can be prevented from translocating due to vibration, and the winding strength can be ensured to be moderate, so as to avoid excessive extrusion of these optical elements.

BRIEF DESCRIPTIONS OF THE DRAWINGS

The present invention will further be explained with reference to drawings and embodiments. In the drawings.

DETAILED DESCRIPTION OF THE EMBODIMENTS

In order to make the purpose, technical solutions and advantages of the present invention clearer, the present invention will further be explained in detail with reference to drawings and embodiments. It should be understood that the embodiment described here are only used for explaining the present invention rather than for limiting the present invention.

Figure 1:
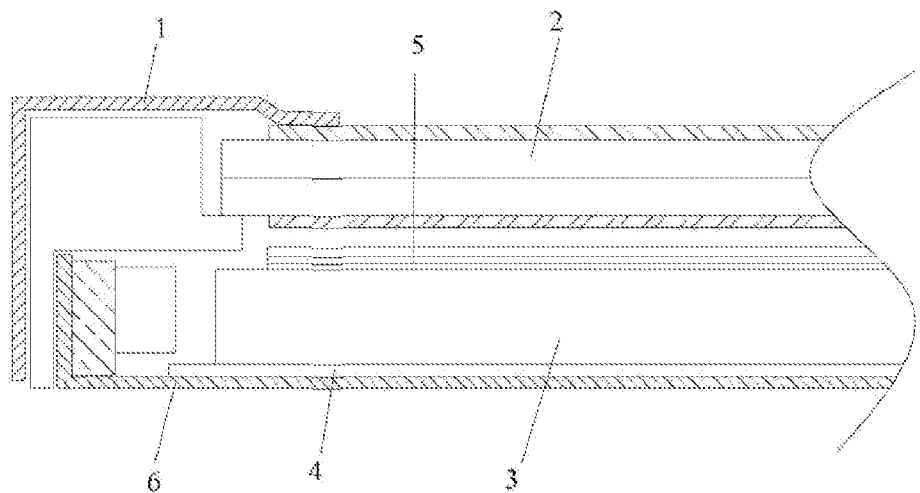
FIG. 1 is a sectional view of the liquid crystal display device in the prior art.
Figure 2:
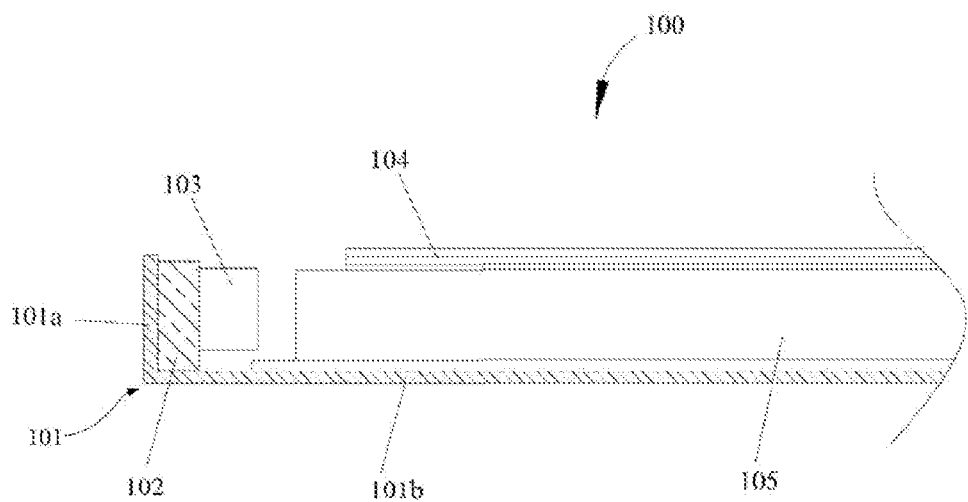
FIG. 2 is a sectional view of the backlight unit of the present invention.

The backlight module of the present invention mainly includes a backlight unit and a fixing belt. FIG. 2 is a sectional view of the backlight unit of the present invention. As shown in FIG. 2, the backlight unit 100 of the present invention comprises a backplate 101, which comprises a backplane 101b and a side plate 101a, wherein the side plate 101a is located at an end of the backplane 101b and perpendicular to the backplane 101b.

The side plate 101a is fixedly provided with a lamp strip 102, on which are arranged a plurality of light sources 103, and the light sources 103 can be LEDs. Above the backplane 101b are successively arranged from up to down an optical film 104, a light guide plate 105, and a reflection plate 106. Wherein the light guide plate 105 is just opposite at its side end to the light source 103, such that the light emitted from the light source 103 enters the light guide plate 105 and is projected from the top surface of the light guide plate 105 after being guided. The optical film 104, arranged on the top surface of the light guide plate 105, can be a diffusion sheet, a prism sheet or the like, but not be limited to these; this optical film 104 can scatter the light guided by the light guide plate 105 more evenly. The reflection plate 106, arranged below the light guide plate 105 and in contact with the bottom of the light guide plate 105, is used for reflecting the light reflected onto the bottom surface of the light guide plate 105 onto the top surface of the light guide plate 105 and emitting, thus improving the utilization rate and luminance of the light.

Figure 3:
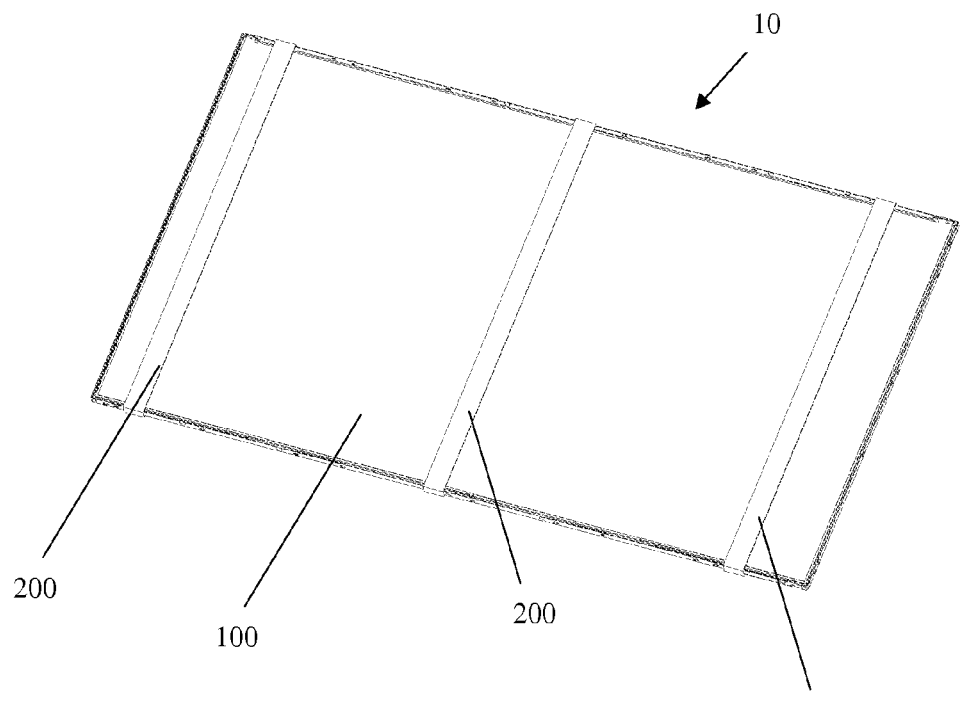
FIG. 3 is a schematic drawing of the backlight module according to the first embodiment of the present invention.

FIG. 3 is a schematic drawing of the backlight module 10 according to the first embodiment of the present invention. As shown in FIG. 3, the backlight module 10 of the present invention further comprises a fixing belt 200. In this first embodiment, this fixing belt 200 is a closed ring in shape; there are a plurality of the fixing belts 200, which are tightly tied outside the backlight unit 100 along the width direction of the backlight unit 100, so as to fix the optical film 104. This width direction is the extension direction of the side plate 101a.

Preferably, the fixing belt 200 is made of elastic materials; thus, it can fix the optical film 104, the light guide plate 105 and the reflection plate 106 tightly on the backplane 101b, especially can prevent the optical film 104 from translocating due to vibration, and meanwhile can ensure the winding strength to be moderate, so as to avoid excessive extrusion of these optical elements. This fixing belt 200 can be for example a packing belt or an elastic ring.

Figure 4:
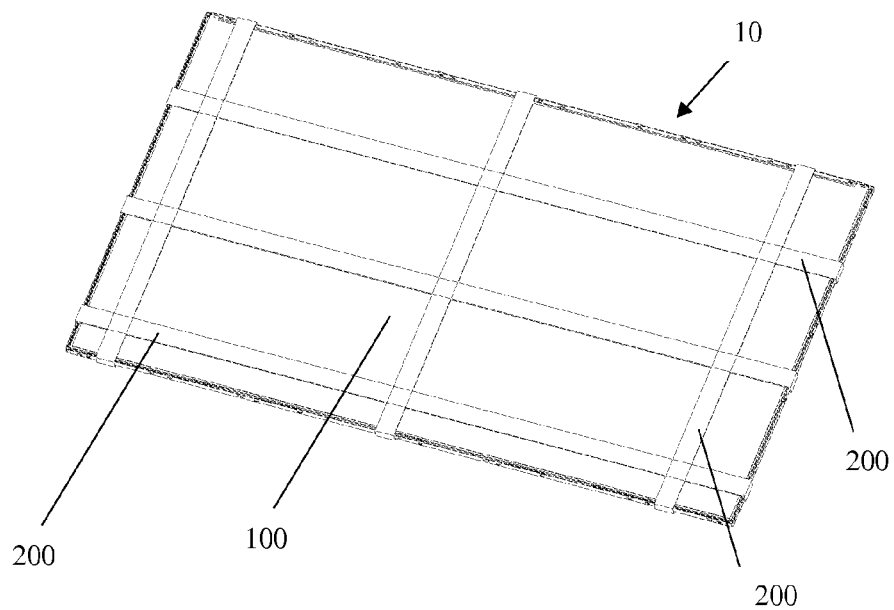
FIG. 4 is a schematic drawing of the backlight module according to the second embodiment of the present invention.

FIG. 4 is a schematic drawing of the backlight module 10 according to the second embodiment of the present invention. As shown in FIG. 4, the backlight unit 100 and the fixing belt 200 of the second embodiment are similar to those of the first embodiment, with the difference in that there are a plurality of the fixing belts 200, which are tightly tied in intersecting pattern outside the backlight unit 100 along the length and width directions of the backlight unit 100. Wherein the length direction is perpendicular to the width direction. Each of the components of the backlight unit 100 in this embodiment is fixed in two directions.

Figure 5:
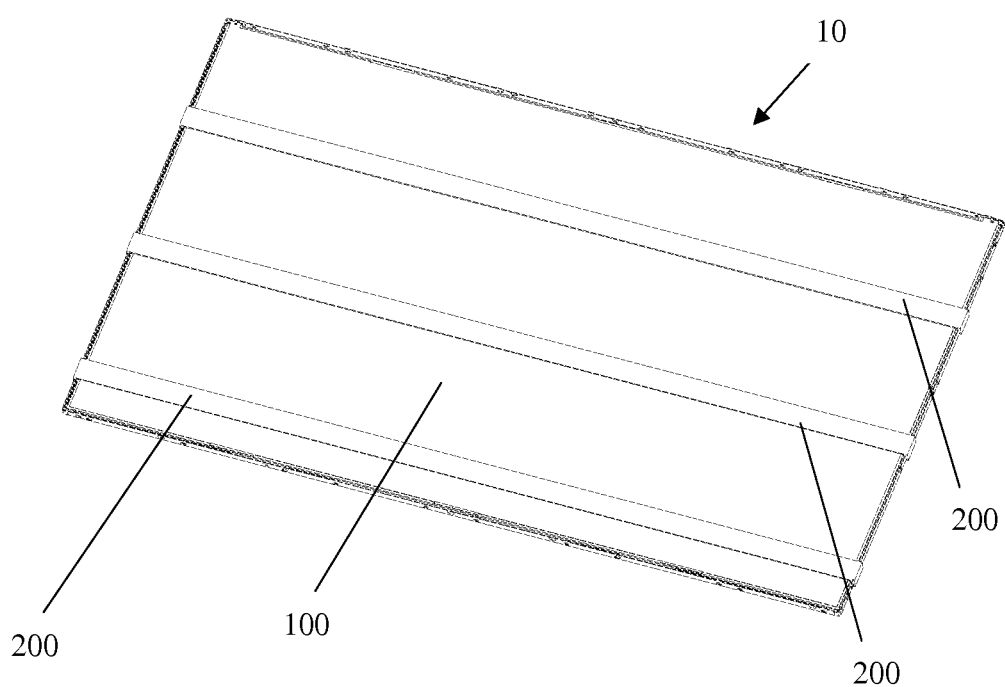
FIG. 5 is a schematic drawing of the backlight module according to the third embodiment of the present invention.

FIG. 5 is a schematic drawing of the backlight module 10 according to the third embodiment of the present invention. As shown in FIG. 5, the backlight unit 100 and the fixing belt 200 of the third embodiment are similar to those of the first embodiment, with the difference in that there are a plurality of the fixing belts 200, which are tightly tied outside the backlight unit 100 along the length direction of the backlight unit 100.

The backlight module 10 of the present invention uses the fixing belt 200 to fix the optical film 104 instead of using the rubber frame to press against the optical film 104, thus the cost of the rubber frame component is saved, the optical film 104 can be prevented from translocating due to vibration, and the winding strength can be ensured to be moderate, so as to avoid excessive extrusion of these optical elements.

All the above are only the preferred embodiments of the present invention, and are not used to limit the present invention. Any amendment, equivalent replacement, improvement, etc. within the spirit and principle of the present invention shall fall within the extent of protection of the present invention.

What is claimed is:

1. A backlight module suitable for transportation, comprising a backlight unit, the backlight unit comprises a backplate, and a light source, as well as an optical film, a light guide plate and a reflection plate arranged in sequence on the backplate from up to down; wherein the backlight module further comprises a plurality of fixing belts used for fixing the optical film, the fixing belts are tightly twined around the backlight unit crisscross along length and width directions of the backlight unit to fix the optical film; and the fixing belts are packing belts or elastic rings.

2. The backlight module suitable for transportation according to claim 1, wherein the backplate includes a backplane, and a side plate located at an end of the backplane and perpendicular to the backplane.

3. The backlight module suitable for transportation according to claim 2, wherein the width direction is the extension direction of the side plate.

4. The backlight module suitable for transportation according to claim 2, wherein the backlight unit further includes a lamp strip fixed on the side plate, with the light source fixed on the lamp strip.

* * * * *